Figure 1:
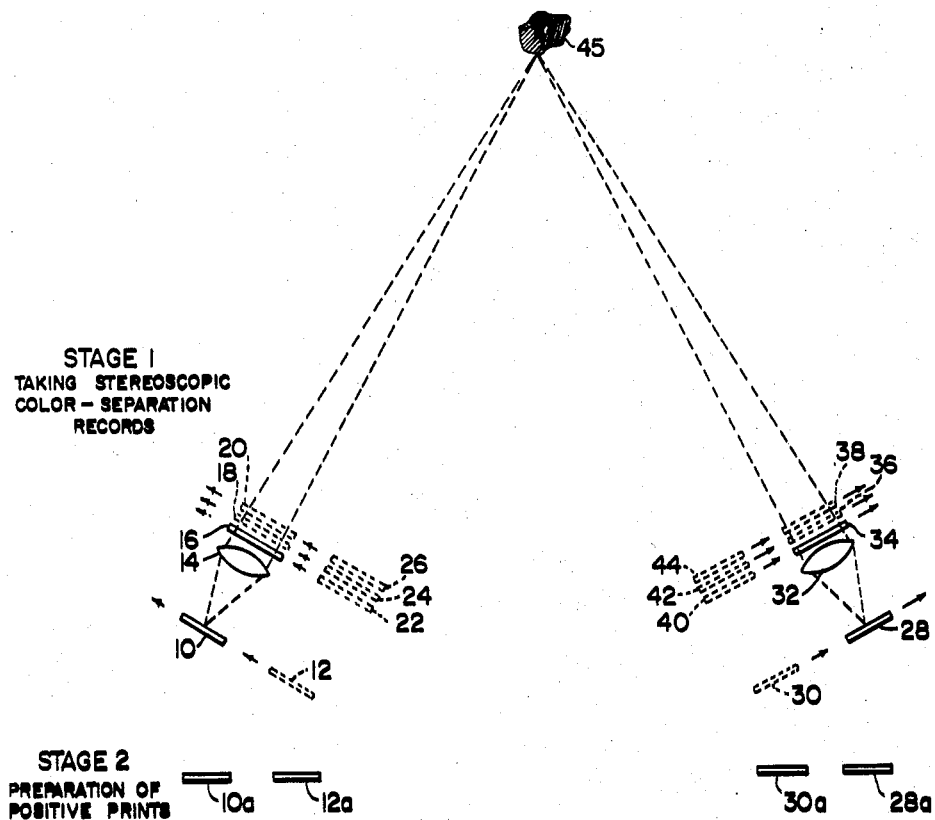
Figure 1:
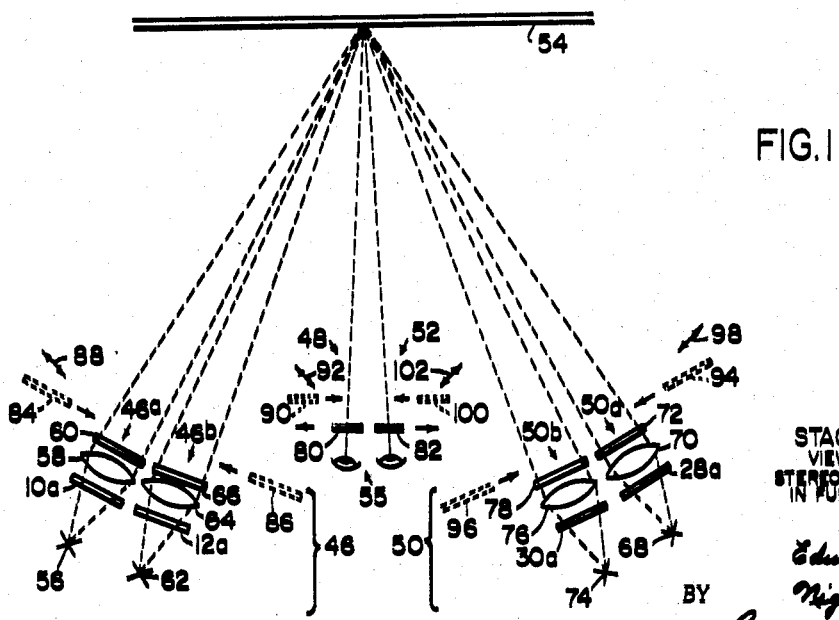

Dec. 7, 1965    E. H. LAND ETAL    3,221,600
METHOD FOR FORMING AND VIEWING COLOR SEPARATION
STEREOSCOPIC IMAGES
Filed Dec. 29, 1961    2 Sheets-Sheet 1

STAGE 1
TAKING STEREOSCOPIC
COLOR-SEPARATION
RECORDS

STAGE 2
PREPARATION OF
POSITIVE PRINTS

STAGE 3
VIEWING
STEREOSCOPICALLY
IN FULL COLOR

INVENTORS
Edwin H. Land
and
Nigel H. Daw
BY
Brown and Mikulka
ATTORNEYS

INVENTORS
Edwin H. Land
Nigel F. Daw
BY
Brown and Mikulka
ATTORNEYS

United States Patent Office 3,221,600
Patented Dec. 7, 1965

3,221,600
METHOD FOR FORMING AND VIEWING COLOR SEPARATION STEREOSCOPIC IMAGES
Edwin H. Land and Nigel W. Daw, Cambridge, Mass., assignors to Polaroid Corporation, Cambridge, Mass., a corporation of Delaware
Filed Dec. 29, 1961, Ser. No. 165,467
7 Claims. (Cl. 88—29)

This invention relates to the formation of stereoscopic images, and more particularly to the formation of stereoscopic images in full color and to improved methods and systems for producing and viewing such images.

This application is a continuation-in-part of the copending application of Edwin H. Land and Nigel W. Daw, Serial No. 138,343, filed September 15, 1961.

The present invention is concerned with producing full-color stereoscopic images having extremely accurate color properties relative to those of the original subject and comprising color components which are so chosen and embodied in the left- and right-eye images that viewing discomfiture, due to retinal rivalry between the eyes of the viewer, is reduced to a minimum or is substantially eliminated.

The terms "retinal rivalry" or "binocular rivalry," as employed herein, are used synonymously and refer to the undesirable visual effects of perceiving an unnatural sheen or lustre in a multi-colored stereoscopic image and to a possibly attendant perception of separate and discrepant stereoscopic image components rather than a single, fused, three-dimensional image. While retinal rivalry is known to be due to such causes as an improper interocular in taking or viewing the stereoscopic pictures, to an incorrect direction of displacement of image components; or to marked differences in hue between the left- and right-eye images to which the eyes cannot properly adjust, the present invention is directed toward a less completely recognized form of retinal rivalry which is principally caused by an imbalance between the sum totals of densities of colored image portions or objects in the left- and right-eye images. Investigation has indicated that the last-named cause of retinal rivalry may be more prevalent and disturbing than those more conventionally recognized and that it can exist even though other of the above-mentioned causes may not be present.

In the interests of substantially eliminating retinal rivalry, particularly of the type due to the aforesaid density differences, the subject invention employs special methods, to be described in detail below, of taking, forming and viewing the images and novel combinations thereof. It includes a very precise selection, arrangement and proportional distribution of color components which, together, make up the color and establish the density of an object or image portion in each of the left- and right-eye images. In forming these images the wavelength characteristics and densities of color-providing components, namely, the densities of a plurality of color-separation records and the colors in which they are rendered or by which they are illuminated, are carefully controlled in a novel manner to provide the requisite balance of color distribution and of densities between left- and right-eye images. A balance of densities, as comprehended herein, may be defined as that in which the density of the sum total of objects, areas or image portions in a left-eye image of a stereoscopic pair of left- and right-eye images which together produce a multicolored (full-color) three-dimensional image, balances the density of the sum total of similar objects, areas or image portions in a right-eye image of said pair of images, the densities being measured in relation to a given "white" on a densitometer corrected for the luminosity curve of the eye.

In accordance with the foregoing considerations, objects of the invention are to provide an improved stereoscopic system for viewing images three-dimensionally and in full color in which color integrity is maintained, and retinal rivalry is substantially eliminated; to provide a system of the character described in which the color-separation and color components of left- and right-eye images differ from one another but have balanced densities (luminosities, brightnesses); to provide a full-color stereoscopic system in which but four color components are employed; to provide a stereoscopic system in which the sum total of taking filter transmissions or absorptions and sensitivity of photographic film emulsion employed for one eye balances that used for the other eye; to provide a full-color composite stereoscopic print in which image components are so balanced in density that the print may be seen without the viewer's experiencing retinal rivalry; to provide a system, as described, wherein a balance of densities is achieved by an image-taking and reproduction method in which a plurality of predetermined color-filter elements is employed in given proportions to provide each one of a pair of left-eye color-separation image components, each component having a cumulatively acquired density, and a pair of right-eye color-or-separation image components also having a cumulatively acquired density which balances that of the left-eye image components, the image components being employed with given color-producing means to form a full-color stereoscopic image devoid of characteristics producing retinal rivalry; to provide a system of the type described wherein the control of image densities is readily effected and thus adapted to a production method; to provide a system of the nature described in which four given color-providing means used in producing the visible stereoscopic image are substantially similar in color to the colors derived from four different combinations of a plurality of taking filter means used in preparing the left-eye and the right-eye color-separation image components; and to provide a method of full-color stereoscopy wherein the photographing and reproduction of images and image components is so accomplished as to produce balanced densities within left- and right-eye images to the end that faithful color rendition is brought about, densities are properly balanced between left- and right-eye images, and no retinal rivalry is experienced.

Other objects of the invention will in part be obvious and will in part appear hereinafter.

The invention, accordingly, comprises the processes involving the several steps and the relation and order of one or more of such steps with respect to each of the others, and the system possessing the features, properties and the relation of elements which are exemplified in the following detailed disclosure, and the scope of the application of which will be indicated in the claims.

Figure 2:
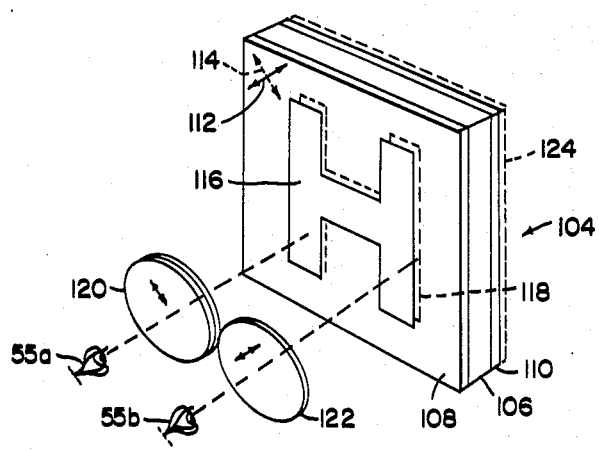

For a fuller understanding of the nature and objects of the invention, reference should be had to the following detailed description taken in connection with the accompanying drawings wherein:

FIGURE 1 is a diagrammatic view illustrating a method or system of the invention; and FIG. 2 is a diagrammatic perspective view of a composite print of the invention in combination with viewing means therefor.

From the objects given above, it can be considered that four principal conditions are to be achieved through the instrumentality of the present invention. They will be repeated here for clarity of understanding and emphasis and are as follows:

(1) The provision of a full and accurate color range.

(2) The balancing of densities between left- and right-eye related color areas or objects of similar identity to reduce retinal rivalry, where left- and right-eye images are relatively different color-separation records produced by relatively different filter or sensitization means.

(3) The production of sensed colors in left- and right-eye images which appear to be sufficiently close to one another to prevent perception of alternate discrepant images.

(4) The use of but four color components, instead of the six conventionally employed, for producing stereoscopic images in full color, emphasis being placed on the words "full color."

The present invention distinguishes from any known stereoscopic system with respect to at least one of the foregoing conditions. Thus, for example, the art shows the use of taking filters for producing color-separation records which are widely divergent as to their locations in the optical spectrum, such as red and yellow taking filters for the records associated with one eye and dark green and dark blue taking filters for the records associated with the other eye. Or, either the colors or densities, or both, in the visible stereoscopic images are intentionally made markedly different from one another for the purpose of restricting the perception of a given image to one eye and the perception of another image to the other eye. Any of these methods must necessarily involve some degree of compromise between color range and integrity and retinal rivalry.

Referring now to FIGURE 1, there is shown, diagrammatically, one embodiment of the invention for producing stereoscopic images in full color, without incurring retinal rivalry. At a first stage, pairs of left- and right-eye, stereoscopic, color-separation views or records are so taken, photographically, that they possess special color and density properties contributing to the aforesaid color and density objectives. At a second stage positive prints are made from the negatives. And at a third stage the prints are projected in a special manner onto a screen for stereoscopic viewing, appropriate viewing means of a cooperating nature being provided to insure that each eye sees only the proper image identified therewith.

The picture-taking means of stage one may, for instance, be considered as including either a single stereoscopic camera, a non-stereoscopic camera moved to two positions, or two cameras positioned in proper laterally-spaced relation for photographing a subject stereoscopically. As shown, it comprises left-eye photosensitive films 10 and 12, such, for example, as panchromatic films of the type, No. 46, sold by Polaroid Corporation, Cambridge, Mass., U.S.A., an objective 14, and color filters 16, 18, 20, 22, 24 and 26. Additionally, it comprises right-eye films 28 and 30, similar to films 10 and 12, an objective 32, and color filters 34, 36, 38, 40, 42, and 44. It is, of course, to be understood that the objectives 14 and 32 are shown merely in rudimentary form, that camera shutter means are omitted and that such devices as mirrors, prisms, beam splitters and the like for controlling light rays may be employed to approximate the more compact optical system of a stereoscopic camera. An object being photographed stereoscopically according to the invention is shown at 45.

The picture-taking procedure illustrated in FIGURE 1 for achieving a balance of densities with attendant color integrity, which constitutes a principal objective of the invention, involves three successive photographic exposures of each film, the exposures being of given relatively different duration and to light from the subject of three given relatively different wavelength bands. Light of the desired wavelengths is selectively transmitted by employing three narrow-band color filters having appropriate given transmission values for the exposure of each of films 10 and 12, that is, six filters in all. The color filters 16, 18 and 20 are used individually for successive exposures of film 10. Film 10 is then removed and film 12 is positioned in its place. Film 12 is successively exposed in the same manner through color filters 22, 24 and 26. This completes the exposure of the left-eye film components 10 and 12. A similar procedure is performed relative to the right-eye film 28, successively employing the color filters 34, 36 and 38, and the right-eye film 30, using the filters 40, 42 and 44. The above-named filters are transmisison type interference filters such as filters of the "Standard Series" type sold by Bausch and Lomb Optical Company, Rochester, New York, U.S.A., with peak transmission values suggested in Tables I, II and III, below. Second order bands are utilized.

An ideal or normal exposure of the film under pre-established conditions of illumination is preliminarily determined as, for example, by experiment, for each of the filters. Once the "normal" exposure for each filter has been established, it is tabulated and individual exposures of films 10, 12, 28 and 30 are made, in accordance with the method of the present invention. An exposure through a given filter is performed for a given fraction of the aforesaid normal exposure for that filter. A suitable group of taking filters, numbered similarly to those shown at Stage 1 of FIGURE 1 and for use with films 10, 12, 28 and 30, thereof, is shown in Table I. Reading from left-to-right, beside each film are listed the three filters used therewith. Beside each filter is given its peak transmission value and the fraction or percentage of the normal exposure time for that filter which is to be employed.

TABLE I (*Film and filter numbers are part numbers shown in FIGURE 1, Stage 1*)

|  | Film | Associated Filter | Peak Transmission, mµ | Exposure |
|---|---|---|---|---|
| Left Eye | 10 | 16 | 630 | ½ normal. |
|  | 10 | 18 | 589 | ¼ normal. |
|  | 10 | 20 | 450 | Do. |
|  | 12 | 22 | 546 | ½ normal. |
|  | 12 | 24 | 589 | ¼ normal. |
|  | 12 | 26 | 450 | Do. |
| Right Eye | 28 | 34 | 589 | ½ normal. |
|  | 28 | 36 | 630 | ¼ normal. |
|  | 28 | 38 | 546 | Do. |
|  | 30 | 40 | 450 | ½ normal. |
|  | 30 | 42 | 630 | ¼ normal. |
|  | 30 | 44 | 546 | Do. |

Applying the data of Table I to the picture-taking procedure exemplified by Stage 1 of FIGURE 1, film 10 is exposed through filter 16 for a period equal to one-half of the normal exposure time for this filter. Film 10 is then exposed successively through filters 18 and 20, the exposure times, in both instances, being equal to one-quarter of the normal exposure therefor. Exposures of films 12, 28 and 30 are then performed in a similar manner, employing the filters and exposure times indicated in Table I. As indicated in the illustration, film 10 is mounted at the focal plane of objective 14 while filters 16, 18 and 20 are successively positioned in and removed from the path of light rays from object 45. Film 10 is then replaced by film 12 and filters 22, 24 and 26 are successively employed in the exposure of the latter. It will be noted that left-eye films 10 and 12 are both exposed while at a single given position relative to object 45 and right-eye films 28 and 30 are exposed at a second given position relative thereto. These two positions, or their equivalents as may be provided by a beam splitter or the like, are so chosen as to facilitate the three-dimensional effect in the positive images ultimately produced, that is with respect to objects or image portions common to both the left- and right-eye images. It will be understood, of course, that these objects or portions, common to both images will for the greater part differ from one another at least to some extent in size and shape because of the two horizontally-spaced positions of the taking means. As previously stated, it is largely within the confines of these objects and image portions that balanced densities and a proper distribution of color components are essential to avoid retinal rivalry and to insure color integrity. In terms of densities produced, the wavelength bands of light passed by the taking filters in combination with the spectral sensitivity of the film for the left eye are substantially the same as the wavelength bands of light passed by the taking filters in combination with the spectral sensitivity of the film for the right eye.

At Stage 2 of FIGURE 1 there is indicated merely the production of positive prints or color-separation records 10a, 12a, 28a, and 30a from the negative films 10, 12, 28 and 30, respectively, of Stage 1. In order not to introduce an artificial imbalance of densities between the prints it is desirable to form them by uniform procedures with respect to exposure or processing. Substantially any suitable method of forming the positive prints may be employed, bearing in mind the aforesaid uniformity of procedure thereunder, as, for example, an image reversal-in-situ-process, contact printing, toning, dye transfer or diffusion transfer. As employed in the projection system of FIGURE 1, the prints 10a, 12a, 28a and 30a may suitably be in the form of transparencies.

Projection and viewing of the completed prints in full color is illustrated at Stage 3. The projection device comprises left-eye projection assembly 46, left-eye viewing means 48, right-eye projection assembly 50, right-eye viewing means 52 and screen 54. The left-eye projection means is composed of two projection subassemblies 46a and 46b that function together to provide a composite image, having given color properties and given density characteristics of image portions, which is visible only to the left eye of the viewer 55. The left-eye subassembly 46a includes a source of white light 56, the positive transparency 10a, an objective 58, and a red filter 60 such as a Wratten filter, No. 24 or No. 29. The left-eye subassembly 46b is composed of a white light source 62, the positive transparency 12a, an objective 64 and a green filter 66 of the type of a Wratten filter, No. 58.

The right-eye projection means similarly comprises two projection subassemblies 50a and 50b that function to provide a composite image of the character described which is seen substantially exclusively by the right eye of the viewer. The right-eye subassembly 50a includes a source of white light 68, the positive transparency 28a, an objective 70, and a yellow filter 72 such as a Wratten filter, No. 73. The right-eye subassembly 50b is composed of a white light source 74, the positive transparency 30a, and objective 76, and a blue filter 78, of the type of a Wratten filter, No. 47B. The numbers of Wratten filters given herein are those of Eastman Kodak Co., Rochester, New York, U.S.A. In general, the widths of the transmission bands of the projection filters are greater than those of the taking filters of Stage 1.

The left-eye viewing means 48, as employed with the projection assemblies just described, is a filter 80 which passes light of red and green wavelengths but not of yellow and blue wavelengths. A filter suitable for such a purpose is a didymium filter incorporating, also, yellow filtering means, namely, a filter of the type of a Wratten filter, No. 77 or 77A. The right-eye viewing means 52 is a filter 82 which passes light of yellow and blue wavelengths but not of red and green wavelengths. An appropriate filter for this purpose is an interference filter in which third and fourth order bands are utilized as, for example, a filter, No. 873–38–15 sold by Bausch and Lomb Optical Company, Rochester, New York, U.S.A.

In a modification of the projection stage or section of the system shown in FIGURE 1, light-polarizing means is employed to segregate or discriminate between the left- and right-eye images so that each is viewed only by the proper eye. For the purpose, plane polarizing projection filters 84 and 86, having a uniform polarizing direction indicated by the double-headed arrow 88, are employed in conjunction with plane polarizing viewing filter or analyzer 90 having a polarizing direction indicated by the double-headed arrow 92 for restricting visibility of the left-eye images to the left eye of the viewer 55. The right-eye images are similarly limited to exclusive viewing by the right eye through the instrumentality of plane polarizing projection filters 94 and 96, having the uniform polarizing direction shown by the double-headed arrow 98 in conjunction with plane polarizing viewing filter 100 having a similar polarizing direction illustrated by the double-headed arrow 102. In employing the light-polarizing elements just described, the viewing filters 80 and 82 would not be required and would be replaced by the filters 90 and 100, respectively.

The choice of light-polarizing or non-light-polarizing projection and viewing filter means, above described, depends in part on the wavelengths of the light employed in projection. Where the left- and right-eye images are segregated through the use of non-polarizing filter means such as the color and didymium filters specified, the wavelength band employed in projecting an image for one eye cannot appreciably overlap the band used in projecting an image for the other eye, or traces of an unwanted image may be noticeable. This restriction does not hold wherein light-polarizing filters are employed for the purpose. With non-light-polarizing projection means, it is not necessary to use a non-depolarizing screen, and the angle of tilt of the head is not important.

As noted, the projection color filters of FIGURE 1 are so chosen as to be adapted to use either in a light-polarizing or non-light-polarizing system. In the system described, sources of white light have been specified, such as tungsten filament lamps. However, it would be possible to eliminate the yellow filter 72 and substitute a source of sodium light for white-light source 68. The paths of light rays shown in Stage 3 are not necessarily to be interpreted as following the exact directions in which they would be projected or reflected and are indicated merely for the purpose of illustration. Thus, for example, the left-eye projection means could be located at the right and the right-eye projection means at the left or some other arrangement of components would be possible within the scope of the invention. It will also be understood that where light-polarizing filters have been shown they may be of a circularly polarizing, rather than a plane polarizing type.

The photographic procedures of Stage 1 in forming color-separation records having given multi-fractional density components representative of the color content of the subject, are adapted to a production technique in that the exposure times are established in advance as percentages of normal exposures, as previously explained, and merely require adherence thereto. It is to be understood, however, that the photosensitive emulsions of films 10, 12, 28 and 30 may be so formulated and sensitized that proper proportions of the color content may be recorded in a lesser number of exposures, using a lesser number of color filters, or even in a single exposure without any filter.

Assuming an object 45 possessing a gamut of colors, an analysis of the colors or neutral densities rendered visible to each eye of the viewer through the system of FIGURE 1, employing the filters of Table I, is as follows. A red object or image portion appears red to the left eye and either orange or gray to the right eye, depending on whether the absorption spectrum of the red object cuts off above or below 589 millimicrons. Green objects or image portions generally appear green to the left eye and gray to the right eye. Yellow objects or image areas in general appear yellow to both eyes. All gray and white objects or image portions appear gray and white to both eyes. All black and white objects or image portions appear black to both eyes. Brown objects or image areas appear brown to one eye and substantially brown to the other. Blue objects or portions appear blue to the right eye and approximately blue, depending on the absorption spectrum of the portion, to the left eye. Magenta objects or areas appear red to the left eye and grayish-blue to the right eye. It is indicated from the foregoing that the colors rendered visible to each eye may be different, but that they should not be too widely different or alternate images involved in retinal rivalry will be observed. In this connection, it is to be noted that objects or image areas may appear red or green to one eye and gray to the other; or yellow to both eyes, etc. without incurring preception of the alternate images associated with retinal rivalry. The system, above described, is capable of producing a close representation of the original scene in color through the instrumentality of the different taking filters used. Colors which are lacking in the picture for one eye are seen in the picture for the other. Thus, reds and greens are perceived by one eye while blues are apparent to the other, an entire gamut of colors being visible without experiencing retinal rivalry, provided that the densities of image portions are similar for both eyes.

In FIG. 2 there is shown an embodiment of the present invention in the form of a print 104, namely, a transparency or, with the addition of a reflective backing, a reflection print for direct viewing. Although the structure is shown as being of a considerable thickness, actually it could be in the form of a relatively thin lamination having a thickness of as little as .005 inch, or even less. Assuming the print 104 to be in the form of a transparency, it comprises a central light-transmitting support layer 106 formed of a plastic such as a cellulosic material, e.g., cellulose acetate butyrate or cellulose triacetate, a front layer 108 composed of a material adapted to be rendered light polarizing, for example, a molecularly oriented, hydroxyl-containing vinyl polymer, such as polyvinyl alcohol, bonded to the front surface of support layer 106, and a rear layer 110 suitably composed of a material similar to that of front layer 108 but molecularly oriented substantially at 90° relative to the molecular orientation of the latter. Rear layer 110 is bonded to the rear surface of cenral layer 106. The light-polarizing directions of layers 108 and 110, when the layers are treated with a proper dye, stain or the like, such as a dichroic direct cotton dye, are indicated by the double-headed arrows 112 and 114, respectively.

A light-polarizing, left-eye stereoscopic image 116, having the polarizing direction 112, is printed, as from a printing matrix imbibed with a dichroic dye or stain, on the surface of layer 108. It is actually a composite image consisting of two partial images or color-separation records, one printed on top of the other, preferably from individual matrices. One image is rendered in a magenta dichroic dye and the other in a cyan dichroic dye, the order of printing being optional. Assuming identical printing times and other uniform printing practices and conditions, the densities of image portions in each printed image are according to, or determined by, the percentages of exposure to the various colors of the photographic subject given under the "left eye" listing of Table I, above, and are provided in terms of the image thicknesses of the printing matrices. A magenta dye suitable for the purpose is Solantine Red 8BL (C.I. 278) or Solantine Pink 4BL (C.I. 353). A suitable cyan dye may, for example, be selected from Niagara Sky Blue 6B (C.I. 518) or Niagara Sky Blue (C.I. 520).

A light-polarizing, right-eye, composite stereoscopic image 118, having the polarizing direction 114, is printed, from a second matrix or matrices, on an exposed surface of layer 110 in dichroic yellow and blue dyes, the densities again being determined by the taking exposures to colored portions of the subject, as set forth in Table I, above, for the "right eye" and reproduced in the printing matrices. A suitable yellow dye is Solantine Yellow 4GL (Prototype 53) or Stilbene Yellow 3GA (C.I. 622). An appropriate blue dye is Chicago Blue (C.I. 516).

A pair of light-polarizing viewers or analyzers 120 and 122 are positioned in front of the left and right eyes 55a and 55b, respectively, of the viewer. In operation, the left eye, looking through the filter 120, sees only the front image 116, rendered in dye densities which are polarized in a direction at 90° to that of filter 120. At the same time, the right eye, looking through the filter 122, sees only the rear image 118 rendered in dye densities which are polarized in a direction at 90° to that of filter 122. Where images and analyzers are polarized in parallel directions the images are substantially invisible, thus preventing the left eye from seeing the right-eye image and vice-versa. A preferably non-depolarizing reflecting backing 124, such as a metallic coating of aluminum, is applied to the rear surface of layer 110 where the print is to be in the form of a reflection print.

Various modifications of the combinations of color-transmission percentages given in Table I are possible, although those of Table I constitute a preferred example. One such modification involves the exposure data given below in Table II. In conjunction with the taking procedures indicated in Table II, or in succeeding tables, the viewing color-providing means for the final stereoscopic image is to be understood as generally similar to that represented by the filters of the projection system of FIGURE 1 or by the dyes of FIG. 2, as previously specified.

TABLE II (*Film and filter numbers are part numbers shown in FIGURE 1, Stage 1*)

|  | Film | Associated Filter | Peak Transmission, mμ | Exposure |
|---|---|---|---|---|
| Left Eye | 10 | 16 | 630 | ¾ normal. |
|  | 10 | 18 | 450 | ¼ normal. |
|  | 12 | 22 | 546 | ¾ normal. |
|  | 12 | 24 | 450 | ¼ normal. |
| Right Eye | 28 | 34 | 630 | ½ normal. |
|  | 28 | 36 | 546 | Do. |
|  | 30 | 40 | 450 | Do. |
|  | 30 | 42 | 630 | ¼ normal. |
|  | 30 | 44 | 546 | Do. |

By employing exposure controls of Table II, the saturation of the reds and greens is increased for the left eye relative to that produced when using Table I. The overall result, that is for both eyes, when compared to that when Table I is employed, is to produce reds which are slightly lighter; greens which are greener; less intense blues; and oranges which are redder. The result is acceptable, however.

As previously mentioned, where color filters in front of the eyes of the viewer are used for separating the left- and right-eye pictures, the wavelengths of light employed in forming the respective images which is incident upon these filters cannot overlap to any appreciable extent. Where light polarizers are employed, this restriction is removed. An example of modified exposure data relating to a system which can employ either color or light-polarizing filters for separation of the images is given in Table III.

TABLE III (*Film and filter numbers are part numbers shown in FIGURE 1, Stage 1*)

|  | Film | Associated Filter | Peak Transmission, mμ | Exposure |
|---|---|---|---|---|
| Left Eye | 10 | 16 | 630 | ½ normal. |
|  | 10 | 18 | 540 | Do. |
|  | 12 | 22 | 450 | Do. |
|  | 12 | 24 | 630 | ¼ normal. |
|  | 12 | 26 | 540 | Do. |
| Right Eye | 28 | 34 | 630 | ¾ normal. |
|  | 28 | 36 | 450 | ¼ normal. |
|  | 30 | 40 | 540 | ¾ normal. |
|  | 30 | 42 | 450 | ¼ normal. |

Assuming the use of Table III and the projection system of FIGURE 1, Stage 3, wherein white light sources are shown, the transparency 10a derived from the negative 10 is projected in red light, using a Wratten filter No. 24 as the filter 60. The transparency 12a is projected in yellow light as, for example, by using a Wratten filter No. 73 or by deleting the filter and using a source of sodium light in place of light source 62. The transparency 28a is projected in green light, substituting a Wratten filter No. 58 for filter 72. The transparency 30a is projected in blue light, using a Wratten filter No. 47 as the filter 78. Relative to the viewing filters, and assuming a non-light-polarizing adaptation of the system, a magenta filter, e.g., a Wratten filter No. 32 is used as the viewing filter 80 and a filter which passes light of a wavelength band at the middle of the optical spectrum, such as a Wratten filter No. 61, as the viewing filter 82.

A further modification involves the use of either of the two taking filter combinations, shown in Tables IV and V, in conjunction with color-providing means, such as projection filters, which are different from those previously described with respect to Tables I, II and III. The modified projection filters are used in place of filters 60, 66, 72 and 78 of FIGURE 1. The filters are adapted to the projection of images in light of red and yellow wavelengths for one eye and green and blue wavelengths for the other. An advantage lies in the fact that with these color-providing means the pair of viewing filters or analyzers, located adjacent to the eyes of the viewer and used in place of filters 80 and 82 of FIGURE 1, is more efficient and passes more light than those previously mentioned in relation to Tables I, II and III. Thus, for example, the red and yellow densities are projected by using a Wratten filter No. 26 and sodium light and the green and blue densities using a Wratten filter No. 61 and a Wratten filter No. 47. The analyzing filters for left and right eyes or vice-versa are, appropriately, an orange filter such as a Wratten filter No. 21, 22 or 23A and a cyan filter of the type of a Wratten filter No. 44A or 64. A line source of light such as a mercury or fluorescent light source may have advantages for use in the aforesaid projection method. The combinations of taking filter data follow in Tables IV and V.

TABLE IV (*Film and filter numbers are part numbers shown in FIGURE 1, Stage 1*)

|  | Film Part No., FIG. 1 | Filter Part No., FIG. 1 | Transmission Filter Eastman Kodak Wratten Nos. | Exposure |
|---|---|---|---|---|
| Left Eye | 10 | 16 | 29 | ¾ normal. |
|  | 10 | 18 | 47B | ¼ normal. |
|  | 12 | 22 | 58 | ¾ normal. |
|  | 12 | 24 | 47B | ¼ normal. |
| Right Eye | 28 | 34 | 58 | ¾ normal. |
|  | 28 | 36 | 29 | ¼ normal. |
|  | 30 | 40 | 47B | ½ normal. |
|  | 30 | 42 | 29 | Do. |

TABLE V (*Film and filter numbers are part numbers shown in FIGURE 1, Stage 1*)

|  | Film Part No., FIG. 1 | Filter Part No., FIG. 1 | Transmission Filter Eastman Kodak Wratten Nos. | Exposure |
|---|---|---|---|---|
| Left Eye | 10 | 16 | 29 | ⅔ normal. |
|  | 10 | 18 | 47B | ⅓ normal. |
|  | 12 | 22 | 58 | ⅔ normal. |
|  | 12 | 24 | 47B | ⅓ normal. |
| Right Eye | 28 | 34 | 58 | ⅔ normal. |
|  | 28 | 36 | 29 | ⅓ normal. |
|  | 30 | 40 | 47B | ⅔ normal. |
|  | 30 | 42 | 29 | ⅓ normal. |

The results obtained through the use of taking filter combinations given in Tables IV and V, in conjunction with the stated projection and viewing filters, are approximately the same for both tables. The reds and greens are satisfactory for both images. The blues are somewhat unsaturated. An advantage lies in the fact that relatively inexpensive filters, such as gelatin filters, can be used in place of didymium and interference filters previously specified with respect to the combinations of Tables I, II and III.

Various other modifications of the methods and systems described herein will be apparent to one skilled in the art and are believed to fall within the scope of the present invention. Thus, for example, a greater number of taking filters than those shown, each having a different transmission peak or passing light of a narrower band of wavelengths, could be employed in exposing any one of the films 10, 12, 28 and 30, in the possible interests of an even more precise control of exposure. Alternatively a single taking filter embodying substantially the characteristics of the plurality of filters and exposure percentages given in the illustrations might be employed in their stead. Again, and as hereinbefore suggested, a modified emulsion, so sensitized as to selectively respond to wavelengths of the type passed by the plurality of filters in the illustration could be utilized, either alone or with filters of a modified nature. It is to be understood that a rear projection or transmission system may be employed instead of the projection system of FIGURE 1. Thus, for example, a light-transmitting projection screen may be employed in place of the screen 54. The principles disclosed are also adapted to television embodiments by employing the required pickup means, color-information channels, and properly responsive phosphors of a receiver, with suitable selective viewing means of the character described.

Since certain changes may be made in the foregoing methods and systems without departing from the scope of the invention herein involved, it is intended that all matter contained in the above description or shown in the accompanying drawings shall be interpreted as illustrative and not in a limiting sense.

What is claimed is:
1. A method of producing and viewing composite multicolored stereoscopic images of a photographic subject wherein color integrity is maintained and retinal rivalry is substantially eliminated through the provision of a predetermined color content and chosen densities of a plurality of left- and right-eye image components, said method comprising the steps of exposing successively to said subject from a first stereoscopic location each film of a first pair of photosensitive films of given spectral sensitization characteristics through a plurality of variously-colored taking filters at exposure times which are selected fractions of the normal times therefor relative to said films, the colors of said filters and the exposure times being at least in part relatively different for each of the films of said pair, exposing successively to said subject from a second stereoscopic location each film of a second pair of photosensitive films of given spectral sensitization characteristics through a plurality of given colored taking filters at exposure times which are selected fractions of the normal times therefor relative to said films, the colors of said filters and the exposure times again being at least in part relatively different for each of the films of said second pair and also at least in part different from the colors of said filters and exposure times employed with said first pair of films, producing first and second pairs of black-and-white color-separation records representative in image content of said first and second stereoscopic locations from said first and second pairs of films, respectively, by any suitable method, said pairs incorporating equally balanced densities of said image content by reason of said film sensitization, taking filters and fractional exposures, positioning each record of said pairs in an individual path of light converging to substantial superimposition at an image plane, placing a colored projection filter having a relatively different transmittance in each said path of light so that a pair of filters composed of relatively long and short wavelength band transmission filters, is positioned in the paths identified with each of said pairs of color-separation records; one pair of said projection filters distinguishing from the other in wavelength characteristics, projecting light along said paths through said records and filters to provide pairs of predeterminedly differentially-colored images in substantial superimposition at an image plane, and viewing said pairs of images binocularly through discriminatory viewing filter means operating in conjunction with discriminatory means identified with said projection filters, to restrict the pairs of images identified with said first and second stereoscopic locations to the separate eyes of the viewer.

2. A method, as defined in claim 1, wherein said taking filters are second-order interference filters differentially combined for producing said pairs of images.

3. A method, as defined in claim 1, wherein, for achieving said color integrity and substantial elimination of said retinal rivalry, said filters are employed in making three successive exposures of each film of said pairs of films the filters used for the first film of said first pair of films having peak transmission values of 630, 589 and 450 millimicrons at one-half, one-quarter and one-quarter of the normal exposures, respectively; for the second film of said first pair of films having peak transmission values of 546, 589 and 450 millimicrons at one-half, one-quarter and one-quarter of the normal exposures, respectively; for the first film of said second pair of films having peak transmission values of 589, 630 and 546 millimicrons at one-half, one-quarter and one-quarter of the normal exposures, respectively; and for the second film of said second pair of films having peak transmission values of 450, 630 and 546 millimicrons at one-half, one-quarter and one-quarter of the normal exposure, respectively, a normal exposure being taken as that for said film material in conjunction with any of said filters which provides a conventionally acceptable single print.

4. A method, as defined in claim 1, wherein one of said pairs of projection filters consists of a red and a green filter and wherein the other of said pairs consists of a yellow and a blue filter.

5. A method, as defined in claim 4, wherein said discriminatory viewing filter means are, respectively, a didymium filter incorporating yellow filtering means passing visible light of red and green wavelengths substantially exclusively, and a third and fourth order band interference filter which passes visible light of yellow and blue wavelengths substantially exclusively.

6. A method, as defined in claim 1, wherein one of said pairs of images is projected in sodium light and wherein one of said discriminatory viewing filter means is a didymium filter for blocking said light.

7. A method, as defined in claim 1, wherein said discriminatory viewing filter means are, respectively, a pair of linearly light-polarizing filters having polarizing directions disposed substantially at 90° to one another, said pair of filters being employed in conjunction with pairs of linearly light-polarizing filters located in said paths of light adjacent to said color-separation records and having polarizing directions disposed predeterminedly with respect to those of said viewing filter means to provide correct restriction of said pairs of images to the individual eyes of the viewer.

References Cited by the Examiner

UNITED STATES PATENTS

| | | | |
|---|---|---|---|
| 2,136,303 | 11/1938 | Lumiere | 88—29 |
| 2,279,281 | 4/1942 | Schensted | 88—16.4 |
| 2,289,714 | 7/1942 | Land. | |
| 2,530,023 | 11/1950 | Millais | 88—16.4 |

DAVID H. RUBIN, *Primary Examiner.*

JEWELL H. PEDERSEN, *Examiner.*